(12) United States Patent
Chen et al.

(10) Patent No.: US 7,885,910 B2
(45) Date of Patent: *Feb. 8, 2011

(54) INTEGRATED METHOD OF ENSURING INSTANT MESSAGING SECURITY ON CONFIDENTIAL SUBJECT MATTER

(75) Inventors: Jim C. Chen, Rochester, MN (US); Christopher J. Kundinger, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 191 days.

This patent is subject to a terminal disclaimer.

(21) Appl. No.: 12/357,482

(22) Filed: Jan. 22, 2009

(65) Prior Publication Data

US 2009/0299927 A1 Dec. 3, 2009

Related U.S. Application Data

(63) Continuation of application No. 12/128,746, filed on May 29, 2008, now Pat. No. 7,509,384.

(51) Int. Cl.
*G06F 17/00* (2006.01)
(52) U.S. Cl. .................... 706/45; 709/206; 709/204
(58) Field of Classification Search ................ 709/206, 709/204; 706/14, 45, 46, 47, 48
See application file for complete search history.

(56) References Cited

U.S. PATENT DOCUMENTS

| | | | | |
|---|---|---|---|---|
| 7,032,007 | B2* | 4/2006 | Fellenstein et al. | 709/206 |
| 7,194,536 | B2* | 3/2007 | Fellenstein et al. | 709/224 |
| 2001/0003202 | A1* | 6/2001 | Mache et al. | 713/153 |
| 2005/0044398 | A1* | 2/2005 | Ballinger et al. | 713/200 |
| 2005/0091610 | A1* | 4/2005 | Frei et al. | 715/804 |
| 2006/0161630 | A1* | 7/2006 | Cohen et al. | 709/206 |
| 2006/0245559 | A1* | 11/2006 | Hodge et al. | 379/88.19 |
| 2007/0162554 | A1* | 7/2007 | Branda et al. | 709/207 |
| 2008/0005254 | A1 | 1/2008 | Adolphs et al. | |
| 2008/0086317 | A1* | 4/2008 | Jones et al. | 705/1 |

OTHER PUBLICATIONS

IOMEGA, Management and Protection for Business Instant Messaging (IM), pp. 1-2, 2007.

* cited by examiner

*Primary Examiner*—Donald Sparks
*Assistant Examiner*—David H Kim
(74) *Attorney, Agent, or Firm*—Cantor Colburn LLP

(57) ABSTRACT

An instant messaging system for securing chat sessions containing confidential subject matter during instant messaging from external entities, the system comprising: a rules engine module configured to continuously build and update a set of rules used to determine when a chat session between a first chat party and a second chat party during an instant messaging session contains confidential or uniquely classified subject matter by loading at least one default rules or previous session rules and enabling a user to provide user-defined rules until the instant message session is ended; and an instant messaging module configured to secure the contents in the chat session based on pre-defined user settings, the contents in the chat session being secured when the contents in the chat session is determined to contain confidential subject matter derived from the set of rules, the chat session is further secured by limiting the exposure of the contents in the chat session to third parties when the chat session is determined to contain confidential subject matter while enabling the first chat party and the second chat party to view the contents in the chat session.

3 Claims, 3 Drawing Sheets

INTEGRATED METHOD OF ENSURING INSTANT MESSAGING SECURITY ON CONFIDENTIAL SUBJECT MATTER

CROSS REFERENCE TO RELATED APPLICATIONS

This application is a continuation of U.S. patent application, Ser. No. 12/128,746, filed May 29, 2008, now U.S. Pat. No. 7,509,384, the contents of which are incorporated herein by reference thereto.

BACKGROUND OF THE INVENTION

1. Field of the Invention

This invention relates to an instant messaging system, and particularly to a system for securing chat sessions containing confidential subject matter during instant messaging sessions.

2. Description of Background

Instant messaging across the Internet is a common chat application that allows instantaneous communication between one or more individuals simultaneously by transmitting information quickly and efficiently through one or more networks. Such instantaneous communication is accomplished through the use of a computer, wireless device, or any text-based communication device having a standard chat application provided by an IM provider.

In today's collaborative work environment there is an increased usage of instant messaging technology such as Sametime for everyday business functions that may involve confidential material. Although these technologies have many embedded and built in security features to ensure that connections between users are secure, there is still room for external factors (i.e. chat logs) to compromise confidential business subject matter logged because of discussions that took place within the instant messaging conversation. Current technologies have the capabilities to log and keep history of chat transcripts, which can be a desirable feature, but could also be a negative feature should someone gain access to another individual's personal computer without permission and begin looking around. In addition, most IT sites now require user and data classification to meet compliance standards. Another problem that arises is that the confidential communication can be exposed to third parties or passersby.

SUMMARY OF THE INVENTION

The shortcomings of the prior art are overcome and additional advantages are provided through the provision of an instant messaging system for securing chat sessions containing confidential subject matter during instant messaging from external entities, the system comprising a rules engine module configured to continuously build and update a set of rules used to determine when a chat session between a first chat party and a second chat party during an instant messaging session contains confidential or uniquely classified subject matter by loading at least one default rules or previous session rules and enabling a user to provide user-defined rules until the instant message session is ended, wherein the determination is performed by continually monitoring the chat session during the instant messaging session and looking at a pre-established context and associated relationship of keywords; and an instant messaging module configured to secure the contents in the chat session based on pre-defined user settings, the contents in the chat session being secured when the contents in the chat session is determined to contain confidential subject matter derived from the set of rules, the pre-defined user settings includes at least saving all confidential transcript of the chat session to a secured directory, encrypting the chat session transcript or not logging the transcript of the chat session transcript, the chat session is further secured by limiting the exposure of the contents in the chat session to third parties when the chat session is determined to contain confidential subject matter while enabling the first chat party and the second chat party to view the contents in the chat session.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution for securing chat sessions containing confidential subject matter during instant messaging sessions.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

The present invention and the various features and advantageous details thereof are explained more fully with reference to the non-limiting embodiments that are illustrated in the accompany drawings and detailed in the following description. Descriptions of well-known or conventional components and processing techniques are omitted so as to not necessarily obscure the present invention in detail. The examples used herein are intended merely to facilitate an understanding of ways in which the invention may be practiced and to further enable those of skill in the art to practice the invention. Accordingly, the examples should not be construed as limiting the scope of the invention.

Exemplary embodiments of an instant messaging system and a method of securing a chat session during an instant messaging session in accordance with the present invention will now be described with reference to the drawings. The exemplary instant messaging system described herein is configured to determine when a chat session during an instant messaging session begins to take on a confidential (or other unique classification) nature. The exemplary instant messaging system described herein is further configured to handle chat sessions deemed to be confidential with a higher level of security both internally on the file system (i.e., database) and externally outside the application so that only the participants in the chat session can view the transcript of the chat session.

Figure 1:
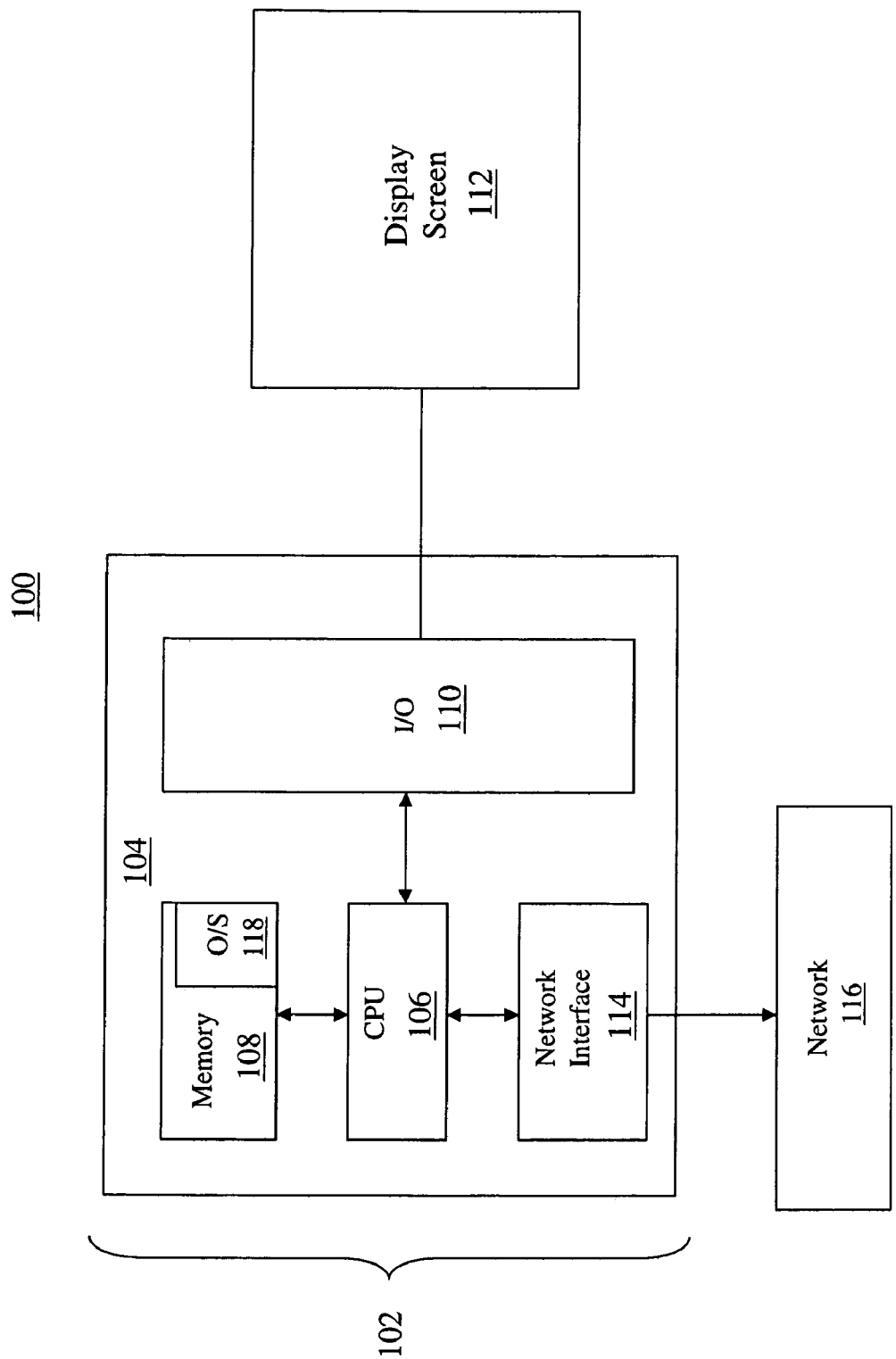
FIG. 1 is a schematic illustrating a computing system in accordance with one exemplary embodiment of the present invention.

FIG. 1 illustrates a computing system 100 that includes an instant messaging security system in accordance with one embodiment of the present invention. The computing system 100 is shown to include a computer 102. The computer 102 is configured to support instant messaging (IM) applications and other computer applications for carrying out the methods described herein. In accordance with one exemplary embodiment, the computer 102 described herein is configured to integrate other computer applications with IM software such that chat sessions deemed confidential during instant messaging sessions are secured.

The computer 102 includes a controller 104 having a central processing unit (CPU) 106, a memory 108, which includes a read-only memory (ROM) and a volatile memory such as a random access memory (RAM) in accordance with one exemplary embodiment. The controller 104 further includes an input/output (I/O) interface 110, which is in signal communication with a display screen 112. As can be appreciated, the computing system 102 can include any computing device, including but not limited to, a desktop computer, a laptop, a server, a portable handheld device (e.g., personal digital assistant (PDA)) or otherwise. Of course, other text-based devices may be used in other exemplary embodiments of the present invention. However, for ease of discussion, exemplary embodiments will be discussed in the context of a computer.

The computer 102 can further include a network interface 114 coupled to a network 116. The network 116 operably transmits and receives data between the computer 102 and external systems (e.g., another computer). More specifically, the network 116 permits a user operating computer 102 to create an instant messaging session with another remote user. It should be understood that the communications described herein are exchanges of messages through instant messaging. These exchanges of messages form a chat session having a transcript that may include confidential subject matter.

The CPU 104 operably communicates with the memory 108, and I/O interface 110. The computer readable media including memory 108 may be implemented using any of a number of known memory devices such as PROMs, EPROMs, EEPROMs, flash memory or any other electric, magnetic, optical or combination memory device capable of storing data, some of which represent executable instructions used by CPU 106.

When the computer 102 is in operation, the CPU 106 is configured to execute instructions by fetching instructions within memory 108 to generally control operations of the computer 102 pursuant to the instructions. In one exemplary embodiment, the memory 106 includes a suitable operating system (OS) 118. The operating system 118 is configured to control the execution of the computer programs (e.g., chat application) installed in the memory 108 and provides scheduling, input-output control, file and data management, memory management, and communication control and related services. The CPU 106 can be any conventional processing unit configured for carrying out the methods and/or functions described herein. In one exemplary embodiment, the CPU 106 comprises a combination of hardware and/or software/firmware with a computer program that, when loaded and executed, permits the CPU 106 to operate such that it carries out the methods described herein.

Computer program means or computer program used in the present context of exemplary embodiments of the present invention include any expression, in any language, code, notation, or the like of a set of instructions intended to cause a system having information processing capabilities to perform a particular function either directly or after conversion to another language, code, notation, or the like, reproduction in a different material form.

In accordance with one exemplary embodiment, the CPU 106 includes the instant messaging security system configured for supporting instant messaging applications or software packages for providing instant messaging capabilities as used in the exemplary embodiments described herein.

Figure 2:
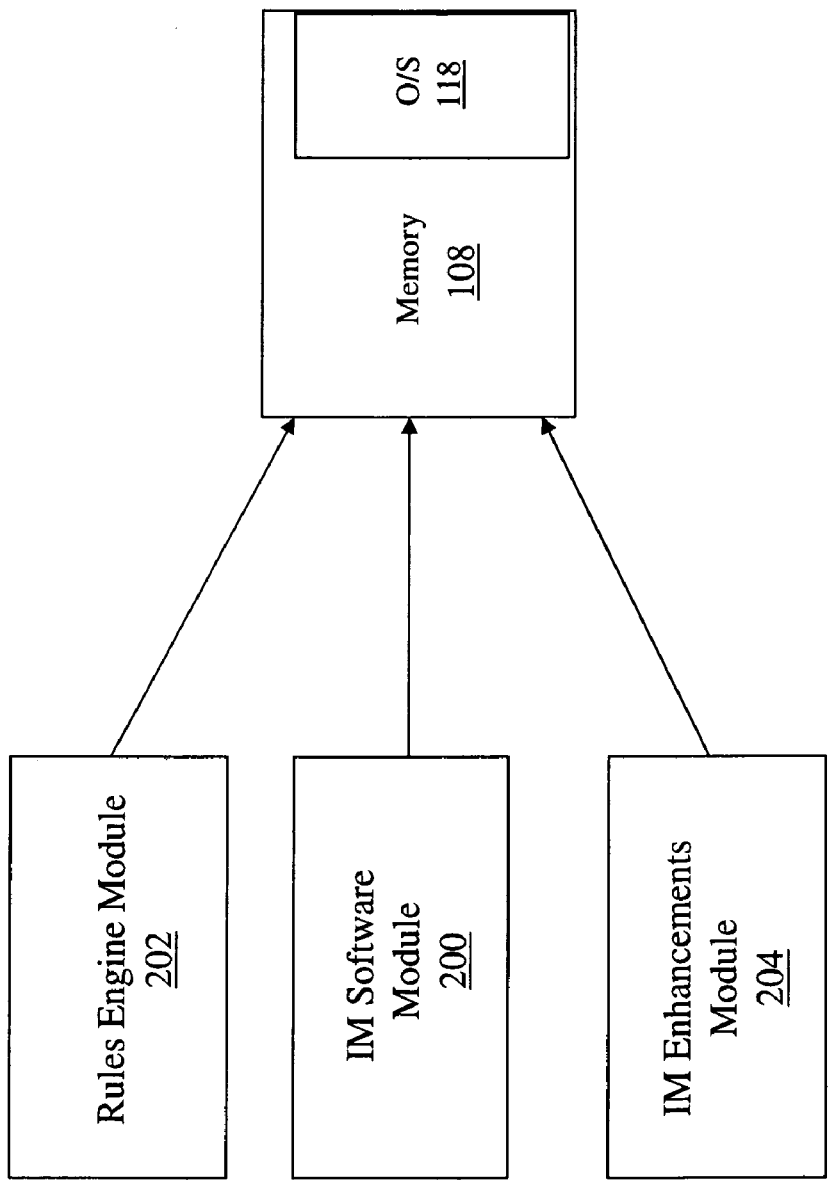
FIG. 2 is an exemplary block diagram of programs/applications implemented in the computing system in accordance with one exemplary embodiment of the present invention.

FIG. 2 illustrates a block diagram of the programs/applications installed in the computer 102 for carrying out the methods described herein. In an exemplary embodiment, the computer 102 includes an IM software module 200, a rules engine module 202, and an IM enhancement module 204. More specifically, an IM application, which is indicated as the IM software module 200, is installed into memory 108 for enabling a chat party to create a chat session with another chat party through IM. The IM application used in the exemplary embodiments of the present invention can be any conventional chat application or software packages for providing instant messaging capabilities. As such, a chat party that is operating computer 102 can exchange messages with another chat party operating a remote computer, thereby forming a chat session between the users.

In accordance with one exemplary embodiment, a rules engine application, which is indicated as rules engine module 202, is installed into memory 108 and integrated with IM software therein. The rules engine module 202 contains a set of rules to derive when a chat session during an instant messaging session becomes confidential. These rules determine the categorical nature of the chat session. These rules can be built by the system as well as user-specified. In accordance with one exemplary embodiment, the rules engine module 202 leverages the integration of IM and mail software pre-installed in the computer 102, automatically and dynamically sweeps the user's mail file for all emails marked "confidential" or of high importance, and collects business keywords from these messages or emails. In other words, the rules engine module 202 automatically and intelligently builds a set of rules to derive confidential subject matter from a chat session during an instant messaging session by scanning through the user's mail file and flagging mail that has been marked "confidential" or regarded as mail containing classified or privileged material and collecting keywords from the flagged mail. These keywords are weighted based on further analysis of context and relationships by the rules engine module 202 in accordance with one exemplary embodiment. In one exemplary embodiment, the rules engine module 202 is continuously sweeping the user's mail file for emails marked confidential or of high importance. As such, the set of rules are continuously being modified or updated accordingly.

Several factors determine the weight of each keyword. Some factors include, but should not be limited to the recipients of the mail and the likelihood of confidential chats with those people (department members, external people, social friends), recent chats on similar topics, frequency of keywords in the mail file, frequency of conversations with that keyword in past chats with a person or a specific group of people, unique phrases or terms associated with that keyword.

In operation, when a high weighted keyword begins to show up in a chat session, the chat session will be flagged to indicate that such chat session contains confidential subject matter. The IM Enhancement module 204 continually monitors the chat session during the instant messaging session to determine if the chat session is of a confidential nature or if the chat session is simply a random occurrence of the keyword by looking at the pre-established context and associated relationships of that keyword to the participants involved in the chat. Although, the contexts of the exemplary embodiments are directed in determining if a chat session includes confidential subject matter, it should be understood that classified data that is unique or of interest may also be monitored, flagged, and handled in accordance with the exemplary embodiments described herein. Confidential subject matter or classified data may also be directed to artifacts, symbols, or the like and should not be limited to keywords.

In accordance with one exemplary embodiment, the rules engine module 202 is configured to provide the user a graphical user interface (GUI) displayed on the display screen 112 for the user to add other rules as well as edit rules contained in the rules engine module 202. The user can add, modify or update rules in the rules engine module 202 at any time (i.e., before, after or during the chat session). The rules engine module 202 also allows the user to define rules for groups of people (i.e., project teams) with keywords, such as, their specific code names. Accordingly, the rules engine module 202 secures confidential communications based on adaptive intelligence and/or user input.

In accordance with one exemplary embodiment, the rules in the rules engine module 202 can also be populated with enterprise corporate compliance regulations, such as SOX, PCI, HIPPA, and other keywords that the corporation defines as a higher security classification (e.g., password, social security number, etc.).

Figure 3:
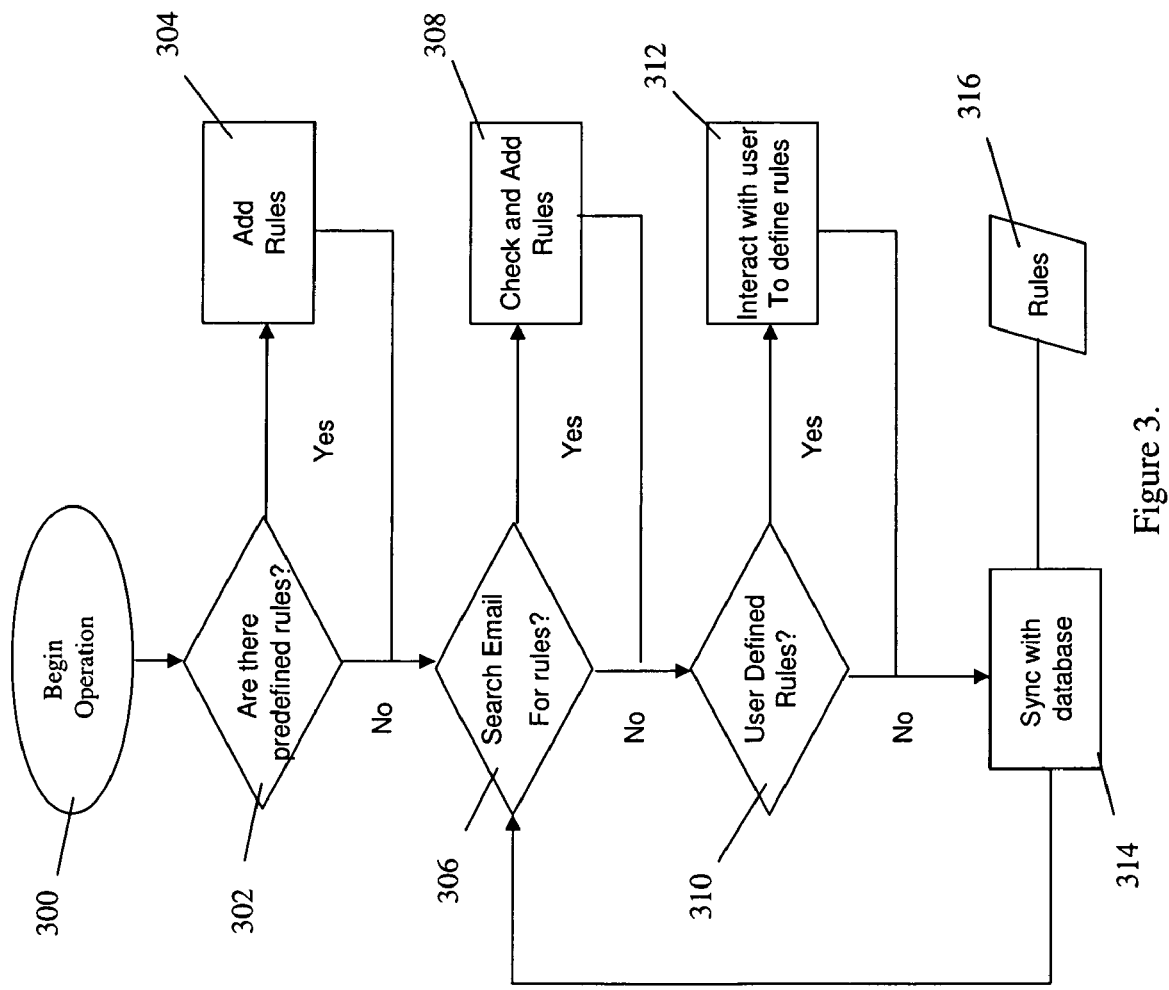
FIG. 3 is an exemplary flow diagram illustrating the operations of a rules engine module implemented in the computing system in accordance with one exemplary embodiment of the present invention.

FIG. 3 illustrates an exemplary flowchart of the operations of the rules engine module 202. Operation begins at block 300. In one embodiment, operation begins once an instant messaging session is initiated. In block 302, the rules engine module 202 will load any default rules or rules established from a previous session and in addition prompt the user via the display screen 112 if there are any predefined rules. These rules can be corporate defined rules. If the answer is yes, the predefined rules are added to the database in memory 108 in block 304. Once block 304 finishes execution or if the answer is no, the rules engine module 202 searches for email through the mail file for rules in block 306. In one exemplary embodiment, the rules engine module 202 searches through emails marked confidential or is regarded as containing classified material in the mail file to create a set of rules. If the emails are properly marked for rules, the rules engine module 202 checks through the emails for keywords as described above and adds these keywords to the database of rules accordingly in block 308. Once block 308 finishes execution or if no emails are found marked for rules, then the rules engine module 202 will check for user initiated input if he or she has any user defined rules in block 310. If the user requests to add a rule, the rules engine module 202 interacts with the user to define rules to add to the database through GUIs in block 312. Once block 312 finishes execution or if there is no user initiated input, the rules engine module syncs all the rules added in blocks 304 and 308, if any, to the database in block 314. As a result, a set of rules are created in block 316 to derive when a chat session becomes confidential as described above. The rules engine module 202 continuously runs blocks 306-314 and continuously updates the set of rules in block 316 until the instant messaging session is ended. In accordance with one exemplary embodiment, the set of rules are saved in the database for subsequent instant messaging sessions.

In accordance with one non-limiting exemplary embodiment, an IM enhancement application, which is indicated as the IM enhancement module 204, is installed into memory 108 and integrated together with the IM application and the rules engine application. In another non-limiting exemplary embodiment, the IM enhancement application is an integral program of the IM application and is enabled accordingly.

The IM enhancement module 204 is configured to scan the chat session content and handle chat sessions deemed confidential by interfacing with the rules engine module 202 with a higher level of security internally in the file system associated with the computer 102. In operation, once the IM Enhancement module 204 determines that a chat session during an instant messaging session is not a normal chat session but contains a uniquely classified set of information (i.e., confidential material or unique data), the IM software module 200 will handle the chat differently. More specifically, the IM software module 200 will not log the chat transcript of the chat session based on pre-defined user settings defined through the IM enhancement module 204 or through the IM software module 200 having IM enhancement program capabilities. Pre-defined user settings may include, but is not limited to, saving all confidential transcripts of the chat session to a secured directory on the computer 102, encrypting the transcript of the chat session itself, or simply not logging the transcript of the chat session internally, externally or both.

In accordance with one exemplary embodiment, other enhancements or applications can be executed through the operating system 118 and implemented through the CPU 106. Such enhancements include reducing the exposure of a chat session deemed to contain confidential or uniquely classified set of information via the rules engine module 202 to external entities (e.g., third parties or passersby). An enhancement that may be implemented includes whiting or blanking the chat text window when it is not the active application or is sitting in the background but still in view via the display screen 112. Another enhancement that may also be implemented includes enabling the IM enhancement module 204 to permit the CPU 106 to functionally call on the display screen 112 to alter its picture such that passersby are prevented from seeing the picture on the display screen 112 clearly when confidential material is detected in the chat session. For example, the LCD light is adjusted on the screen such that only the immediate user can view the chat session. In another example, the physical text in the chat session is thinned and dulled slightly to make it difficult for an "over the shoulder" glimpse. Other enhancements may be implemented to reduce the exposure of the chat session deemed confidential to external entities.

In one example, user A (operator of computer 102) and user B (operator of a remote computer) create a chat session during an instant messaging session. The chat is of typical non-classified nature until the either user begins typing classified keywords/project content in their chat session. The chat session is now detected to be of a confidential nature by the IM enhancement module 204 interfacing with the rules engine module 202. The IM enhancement module 204 concludes, by examining the text of the current chat session in relation to the rules established by the rules engine module 202, that the chat session contained confidential or classified subject matter and the IM software module 200 handles the chat session based on predefined user settings (e.g., encrypt chat session) defined through the IM enhancement module 204 to secure any transcripts or history of the chat session. Then, other enhancements are initiated to limit external exposure of the chat session, such as adjusting the actual picture in the screen display 112.

It should be understood that although exemplary embodiments described herein are directed towards a business environment and for business use, such embodiments may also be used in a personal environment or for personal use. It should further be understood that a chat session having the security methods described herein can be created between more than two chat parties in other exemplary embodiments of the present invention. For example, a chat session can be created between groups of chat parties and so on.

Advantageously, one chat party can chat with another chat party (remote or local) without the fear of accidentally exposing confidential subject matter to third parties or parties not involved in the chat session. As such, the contents in the chat session are exposed only to the chat parties, while exposure of the contents in the chat session is limited to third parties when the contents in the chat session are deemed to include confidential subject matter.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An instant messaging system for securing chat sessions containing confidential subject matter during instant messaging from external entities, the system comprising:

a rules engine module configured to continuously build and update a set of rules used to determine when a chat session between a first chat party and a second chat party during an instant messaging session contains confidential or uniquely classified subject matter by loading at least one default rules or previous session rules and enabling a user to provide user-defined rules until the instant message session is ended, wherein the determination is performed by continually monitoring the chat session during the instant messaging session and looking at a pre-established context and associated relationship of keywords; and an instant messaging module configured to secure the contents in the chat session based on pre-defined user settings, the contents in the chat session being secured when the contents in the chat session is determined to contain confidential subject matter derived from the set of rules, the pre-defined user settings includes at least saving all confidential transcript of the chat session to a secured directory, encrypting the chat session transcript or not logging the transcript of the chat session transcript, the chat session is further secured by limiting the exposure of the contents in the chat session to third parties when the chat session is determined to contain confidential subject matter while enabling the first chat party and the second chat party to view the contents in the chat session.

2. The instant messaging system as in claim 1, wherein the rules engine module leverages the integration of an instant messaging application and mail software installed in a computing device, the instant messaging application enables the instant messaging session.

3. The instant messaging system as in claim 2, wherein the rules engine module is configured to automatically sweep across a mail file of the first chat party for emails marked as classified and collect keywords from emails marked as classified, the collected keywords being used to build the set of rules.

* * * * *